United States Patent [19]

Vos

[11] Patent Number: 5,255,597
[45] Date of Patent: Oct. 26, 1993

[54] WIRE CATCH FOR A BALER

[75] Inventor: Dirk J. Vos, Veendam, Netherlands

[73] Assignee: Machinefabriek Bollegraaf Appingedam B.V., Veendam, Netherlands

[21] Appl. No.: 874,070

[22] Filed: Apr. 24, 1992

[30] Foreign Application Priority Data

Apr. 26, 1991 [NL] Netherlands ............... 9100731

[51] Int. Cl.⁵ .................... B65B 27/12; B65B 13/08
[52] U.S. Cl. ............................ 100/17; 56/448; 100/19 R; 100/24
[58] Field of Search ............... 100/17, 18, 19 R, 24; 56/448

[56] References Cited

U.S. PATENT DOCUMENTS

| 1,452,714 | 4/1923 | Seymour | 100/24 |
| 3,036,514 | 5/1962 | McDuffie | 100/19 R |
| 4,092,913 | 6/1978 | Tea | 100/24 |
| 4,466,345 | 8/1984 | Kaldenbach | 100/19 R |

FOREIGN PATENT DOCUMENTS

| 138012 | 8/1950 | Australia | 100/24 |
| 0235378A3 | 2/1989 | European Pat. Off. | |
| 2460464 | 6/1976 | Fed. Rep. of Germany | |
| 3544773 | 6/1987 | Fed. Rep. of Germany | |
| 833175 | 10/1938 | France | |
| 2254483 | 7/1975 | France | 100/19 R |
| 7612920 | 5/1977 | Netherlands | |
| 1505338 | 3/1978 | United Kingdom | |

Primary Examiner—Stephen F. Gerrity
Attorney, Agent, or Firm—Merchant, Gould, Smith, Edell, Welter & Schmidt

[57] ABSTRACT

Wire catch for a baler comprising an elongated wire catch body having between a fixed end and a free end thereof a recess in which is suspended a wheel. The axis of rotation of the wheel is directed substantially transverse to the centerline of the wire catch body. The recess comprises a first guide surface adjoining a circumferential portion of the wheel that faces the fixed end. A second guide surface is provided opposite the first guide surface, which second surface converges towards the first guide surface in the direction of the free end of the wire catch body. According to the invention, the second guide surface is constituted by a portion, located remote from the first guide surface, of the circumferential portion of the wheel that faces the fixed end. The invention prevents the space between the first and the second guide surfaces from becoming clogged with compressed material.

6 Claims, 2 Drawing Sheets

WIRE CATCH FOR A BALER

BACKGROUND OF THE INVENTION

This invention relates to a wire catch for a baler comprising an elongated wire catch body having between a fixed end and a free end thereof a recess in which is suspended a wheel having an axis of rotation directed substantially transverse to the centreline of the wire catch body, while the recess on the side of the free end is closed and bounded by a portion of the wire catch body that screens the wheel and on the side of the fixed end comprises a first guide surface joining a circumferential portion of the wheel facing the fixed end, a second guide surface being provided opposite the first guide surface, said first and second guide surfaces converging in the direction of the free end of the wire catch body.

Such wire catches are known from U.S. Pat. No. 4,092,913 and German patent applications 24 60 464 and 35 44 773 and intended for pulling a tie wire towards an oppositely arranged tie wire, whereafter the tie wires can be twisted together. Typically, the wire catches are mounted by their fixed end on an operating rod, by means of which the wire catches can be passed through grooves in a baling head that is in abutment with a compressed bale (for instance from used paper or harvested material), and retracted for engaging and pulling a loop of the wire.

The free end of the wire catch body is designed to push away any compressed material bulging into the grooves as the wire catch body is moved towards the opposite wire. The guide surfaces converging in the direction of the free end of the wire catch body are designed to cause the opposite wire to be hooked in the recess and guided towards the wheel as the wire catch is retracted after it has been moved past this opposite wire.

A drawback of the prior art wire catches is that as the wire catch is retracted, material accumulates between the guide surfaces, with the result that the wire is prevented from hooking in the recess, or material sticks to the bearing surface of the wheel, so that the wheel jams.

The object of the invention is to provide a wire catch in which this drawback is overcome.

BRIEF SUMMARY OF THE INVENTION

This object is realized according to the invention in that the second guide surface is constituted by a portion, located remote from the first guide surface, of the circumferential portion of the wheel that faces the fixed end.

Owing to the second guide surface being constituted by a circumferential portion of the wheel, compressed material that has penetrated into the space between the guide surfaces can easily be removed from that space by rotation of the wheel. Moreover, by virtue of the configuration of the second guide surface, which bends away laterally from the first guide surface, relatively little compressed material will stick between the guide surfaces.

A further advantage of the wire catch according to the invention is that it can be made in one piece in a relatively simple manner, because the recess in the wire catch body need not be provided with two opposite guide surfaces adjacent a space for suspending the wheel.

The invention will now be further illustrated and explained, by way of example, on the basis of a few embodiments, with reference to the accompanying drawings.

DETAILED DESCRIPTION OF SOME EMBODIMENTS

Figure 2:
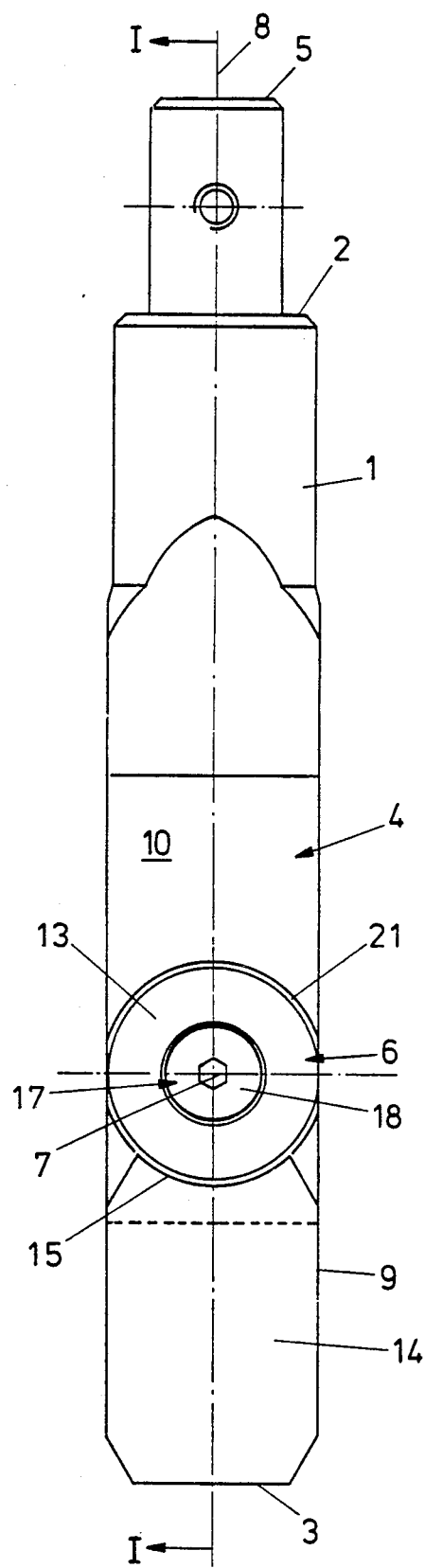
FIG. 2 is a front view of the wire catch shown in FIG. 1.
Figure 1:
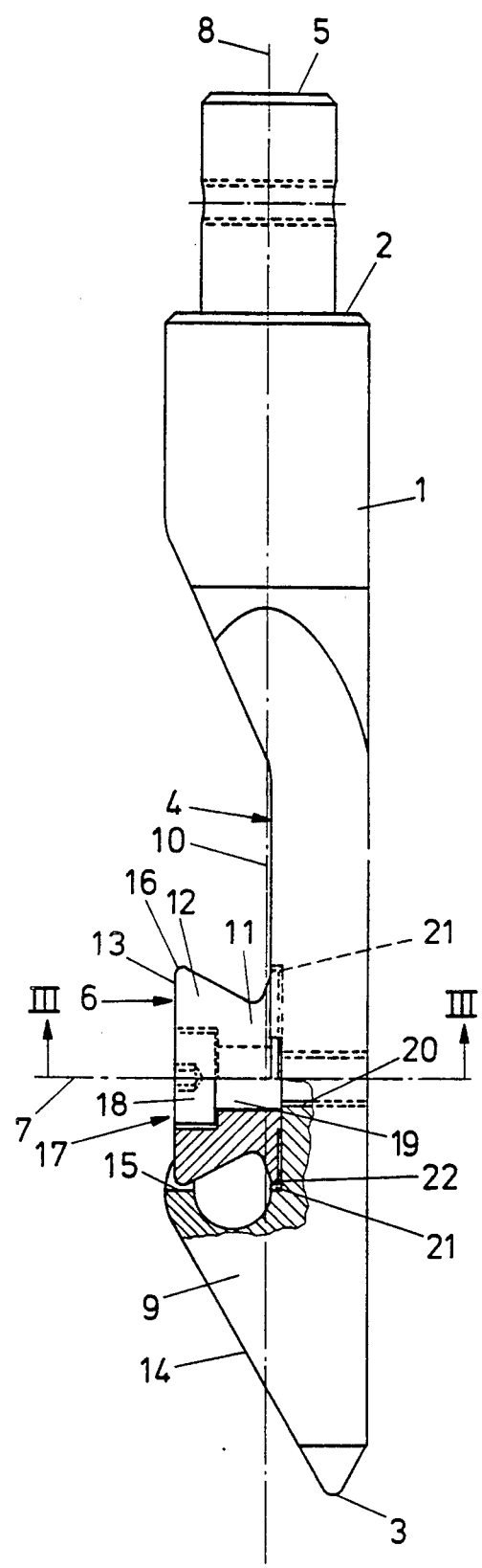
FIG. 1 is a side elevation of a wire catch according to a preferred embodiment of the invention and a partly sectional view taken on the line I—I of FIG. 2.
Figure 3:
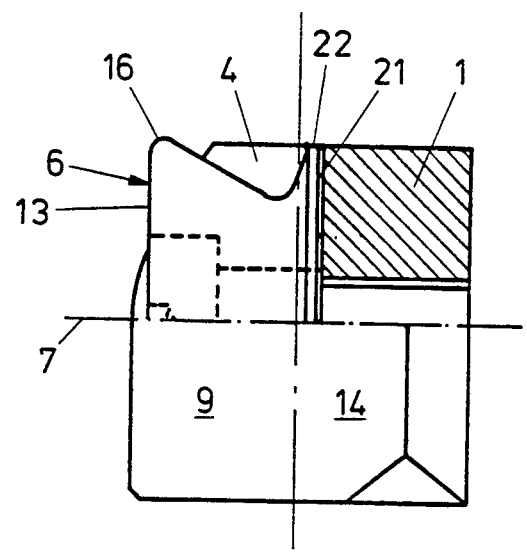
FIG. 3 is a bottom view of the wire catch shown in FIG. 1 and a partly sectional view taken on the line III—III of FIG. 1.

FIGS. 1, 2 and 3 show a preferred embodiment of the wire catch according to the invention. The wire catch comprises an elongated wire catch body 1 having a recess 4 between a fixed end 2 and a free end 3. The fixed end 2 is provided with an attachment pin 5, but may also be constituted by the fixed end of an operating rod. Suspended in the recess 4 is a wheel 6 having its axis of rotation 7 directed substantially transverse to the centreline 8 of the wire catch body 1. The recess 4 is bounded on the side of the free end 3 by a portion 9 of the wire catch body 1 that screens the wheel 6 and the recess 4 comprises a first guide surface 10 on the side of the fixed end 2. This first guide surface 10 adjoins a circumferential portion 11 of the wheel 6 that faces the fixed end 3. Located opposite the first guide surface 10 is a second guide surface, which converges towards the first guide surface in the direction of the free end 3 of the wire catch body 1 and is formed by a portion 12, located remote from the first guide surface 10, of the circumferential portion 11 of the wheel 6 that faces the fixed end 3.

In operation, the wire catch with its free end in leading position is displaced through a groove of the baling head, until at least the wheel 6 has passed the wire to be engaged. The wire catch is held in an orientation such that the wire extends substantially transverse to the centreline 7 of the wheel 6 and positioned relative to the wire such that the wire catch, with the recess 4 facing the wire, is passed along the wire and presses against the wire. Then the wire catch is retracted whereby the wire is hooked in the recess 4 and a loop of the wire is pulled along by the wheel 6. The loop rolls over the wheel 6 as the wire catch is retracted in that one end of the loop is fixed and the other end yields as the wire catch is retracted.

A bevelled surface 14 provided on the side of the recess 4 ensures that the wire catch pushes the wire to the side of the recess 4 as the free end 3 of the wire catch passes the wire.

Compressed material that has penetrated into the space between the guide surfaces 10 and 12 can easily be removed from that space by rotation of the wheel. Moreover, by vitue of the configuration of the second guide surface, bending away laterally from the first guide surface, relatively little compressed material will stick between the guide surfaces 10 and 12.

The wire catch body 1 leaves clear the lateral face 13 of the wheel 6, facing away from the first guide surface 10, and the wheel is mounted on the wire catch body 1 exclusively on the side of the first guide surface 10. This provides the advantage that at a certain thickness of the wire catch body 1, the second guide surface 12 constituted by the wheel 6 can project to a relatively large extent for reliably catching the wire and that the portion of the recess 4 on the side of the free end 3 is relatively well accessible, so that the manufacture of the recess is further facilitated. The bending load on the suspension of the wheel 6, which is provided exclusively on the side of the first guide surface is limited in that a loop of a wire engaged by the wheel 6 will slide to the deepest portion of the circumferential surface of the wheel 6 before it can exert a large force on the wheel 6. This will prevent the exertion of a large force on a portion of the wheel 6 remote from the first guide surface 10.

The bending load on the suspension of the wheel 6 can be further limited if the wheel 6 has an asymmetrical circumferential profile, the deepest portion thereof being located closer to the first guide surface 10 than to the lateral face 13 of the wheel 6, facing away from the first guide surface 10. A further advantage of this feature is that at a certain axial position of the deepest portion of the circumferential profile of the wheel 6 relative to the centreline 8 of the wire catch body 1, the portion of the wire catch body 1 adjacent the wheel can be relatively thick.

The wheel 6 is suspended from the wire catch body 1 by means of a fitted bolt 17. The fitted bolt 17 has a head 18 to which connects a cylinder-shaped bearing portion 19 which in turn connects to a threaded portion 20 of smaller diameter than the bearing portion 19 so that this can be screwed against the wire catch body 1.

The recess 4 comprises, on the side of the free end 3 of the wire catch body 1, an edge 15 coaxial with the wheel 6, this edge 15 having a slightly larger radius than the circumferential edge 16 of the wheel 6 remote from the first guide surface 10, in such a manner that the wire catch body 1, on the side of the free end 3, adjoins with a slight interspace the circumferential edge 16 of the wheel 6 remote from the first guide surface 10. This further prevents compressed material from penetrating the space between the wheel 6 and the wire catch body 1.

The recess 4 comprises a chamber 21 contiguous to the first guide surface 10 and of circular configuration at least on the side of the fixed end 3 of the wire catch body 1, this chamber having a slightly larger radius than the radius of the circumferential edge 22 of the wheel 6 on the side of the first guide surface 10, this circumferential edge 22 of the wheel 6 being recessed in chamber 21. This feature prevents compressed material or the wire engaged from penetrating the space between the wheel 6 and the wire catch body 1. A further advantage of this feature is that it permits a relatively large axial clearance of the wheel 6 without allowing material to readily penetrate into the space between the wheel 6 and the wire guide body 1.

Figure 4:
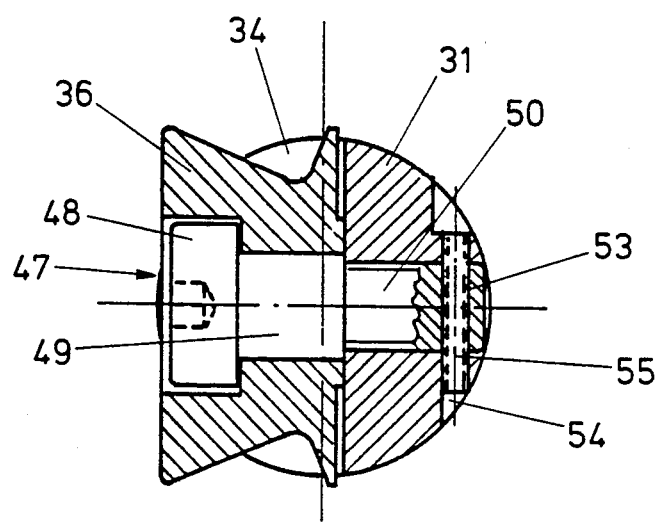
FIG. 4 is a sectional bottom view of a wire catch according to a further embodiment of the invention.

FIG. 4 shows a further embodiment of a wire catch according to the invention. This wire catch has a wire catch body 31 which is formed from a section of circular cross-section. This is advantageous for penetrating compressed material. A recess 34, a wheel 36 and a fitted bolt 47 with a head 48, a bearing portion 49 and a threaded portion 50 correspond respectively with the recess 4, the wheel 6 and the fitted bolt 17 with the head 18, the bearing portion 19 and the threaded portion 20 of the embodiment shown in FIGS. 1–3. However, the fitted bolt 47 and the wire catch body are moreover provided with coaxial bores 53 and 54, having a locking pin 55 inserted therein for locking the fitted bolt 47. However, the bolt may also be locked with other knwon locking means.

It is observed that within the framework of the invention, many further embodiments of the invention are possible. Thus, the wire catch according to the invention may be equipped with two wheels, as is known from U.S. Pat. No. 4,092,913. Further, the wire catch body may be composed of a plurality of parts, which have been interconnected by welding or by a bolt. The wire catch body can further be made by casting or by removing material starting from a round, square or otherwise shaped section.

I claim:

1. A wire catch for a baler comprising an elongated wire catch body having between a fixed end and a free end thereof a recess in which is suspended a wheel having an axis of rotation directed substantially transverse to the centerline of the wire catch body, while the recess on the side of the free end is closed and bounded by a portion of the wire catch body which screens the wheel and on the side of the fixed end comprises a first guide surface joining a circumferential portion of the wheel that faces the fixed end, a second guide surface being provided opposite the first guide surface, said second surface converging towards the first guide surface in the direction of the free end of the wire catch body, wherein the second guide surface is constituted by a portion, located remote from the first guide surface, of the circumferential portion of the wheel that faces the fixed end, and the wheel has an asymmetrical circumferential profile with a deepest portion between the first guide surface and a lateral face of the wheel facing away from the first guide surface, said deepest portion being located closer to the first guide surface than to the lateral face of the wheel, facing away from the first guide surface.

2. A wire catch for a baler comprising an elongated wire catch body having between a first end and a free end thereof a recess in which is suspended a wheel having a circumferential edge and having an axis of rotation directed substantially transverse to the centerline of the wire catch body, while the recess on the side of the free end is closed and bounded by a portion of the wire catch body which screens the wheel and on the side of the fixed end comprises a first guide surface joining a circumferential portion of the wheel that faces the fixed end, a second guide surface being provided opposite the first guide surface, said second surface converging towards the first guide surface in the direction of the free end of the wire catch body, wherein the second guide surface is constituted by a portion, located remote from the first guide surface, of the circumferential portion of the wheel that faces the fixed end, and the recess, on the side of the free end of the wire catch body, comprises an edge having a substantially constant radius of curvature which extends along substantially its entire length substantially coaxial with the wheel, said edge having a slightly larger radius than the circumferential edge of the wheel that is remote from the first guide surface, in such a manner that the wire catch body, on the side of the free end, adjoins with a slight substantially constant interspace the circumferential edge of the wheel remote from the first guide surface.

3. A wire catch as claimed in claim 2, wherein the recess further comprises a chamber adjacent to the first guide surface and having peripheral edges each having a substantially constant radius of curvature which extend along substantially their entire lengths substantially co-axial with the wheel, such that said chamber has a slightly larger radius than the radius of the circumferential edge of the wheel on the side of the first guide surface, said circumferential edge of the wheel being recessed in said chamber.

4. A wire catch for a baler comprising an elongated wire catch body having between a fixed end and a free end thereof a recess in which is suspended a wheel having an axis of rotation directed substantially transverse to the centerline of the wire catch body, while the recess on the side of the free end is closed and bounded by a portion of the wire catch body which screens the wheel and on the side of the fixed end comprises a first guide surface joining a circumferential portion of the wheel that faces the fixed end, a second guide surface being provided opposite the first guide surface, said second surface converging towards the first guide surface in the direction of the free end of the wire catch body, wherein the second guide surface is constituted by a portion, located remote from the first guide surface, of the circumferential portion of the wheel that faces the fixed end, the wheel has a lateral face facing away from the first guide surface, the wire catch body leaves clear the entire lateral face of the wheel, facing away from the first guide surface, and the wheel is rotatably connected to the wire catch body exclusively on the side of the first guide surface.

5. A wire catch as claimed in claim 4, wherein the wheel has an asymmetrical circumferential profile with a deepest portion between the first guide surface and a lateral face of the wheel facing away from the first guide surface, said deepest portion being located closer to the first guide surface than to the lateral face of the wheel which faces away from the first guide surface.

6. A wire catch for a baler comprising an elongated wire catch body having between a fixed end and a free end thereof a recess in which is suspended a wheel having a circumferential edge and having an axis of rotation directed substantially transverse to the centerline of the wire catch body, while the recess on the side of the free end is closed and bounded by a portion of the wire catch body which screens the wheel and on the side of the fixed end comprises a first guide surface joining a circumferential portion of the wheel that faces the fixed end, a second guide surface being provided opposite the first guide surface, said second surface converging towards the first guide surface in the direction of the free end of the wire catch body, wherein the second guide surface is constituted by a portion, located remote from the first guide surface, of the circumferential portion of the wheel that faces the fixed end, and the recess comprises a chamber substantially adjacent to the first guide surface and having peripheral edges each having a substantially constant radius of curvature which extend along substantially their entire lengths substantially co-axial with the wheel, such that said chamber has a slightly larger radius than the radius of the circumferential edge of the wheel on the side of the first guide surface, said circumferential edge of the wheel being recessed in said chamber.

* * * * *